United States Patent [19]

Keller et al.

[11] 4,158,587

[45] Jun. 19, 1979

[54] METHOD OF PRODUCING LAMINATED SHEETS USING LAMINATED POUCH SUPPORT

[75] Inventors: Jack L. Keller, Lincolnshire; Jerome J. Wiermanski, Wayne, both of Ill.

[73] Assignee: General Binding Corporation, Northbrook, Ill.

[21] Appl. No.: 836,587

[22] Filed: Sep. 26, 1977

[51] Int. Cl.² .................................................. B32B 31/16
[52] U.S. Cl. .................................... 156/216; 40/2.2; 156/226; 156/239; 156/306; 156/323; 156/227; 156/247; 156/309; 206/491; 283/7; 283/9 R; 428/40; 428/124; 428/349; 428/76; 428/202
[58] Field of Search .............. 156/216, 226, 227, 239, 156/247, 249, 309, 323, 344, 306; 428/40, 76, 124, 202, 349, 354, 483; 206/491; 283/7, 9 R; 40/2.2

[56] References Cited

U.S. PATENT DOCUMENTS

| | | | |
|---|---|---|---|
| 2,030,135 | 2/1936 | Carpenter | 156/344 |
| 2,746,893 | 5/1956 | Matthes | 428/202 |
| 3,257,228 | 6/1966 | Reed | 428/354 |
| 3,401,439 | 9/1968 | Staats et al. | 29/130 |
| 3,684,635 | 8/1972 | Staats | 40/2.2 |
| 3,711,355 | 1/1973 | Staats et al. | 156/499 |
| 3,836,414 | 9/1974 | Staats | 428/483 |
| 3,943,031 | 3/1976 | Krueger et al. | 156/306 |

Primary Examiner—John T. Goolkasian
Assistant Examiner—J. J. Gallagher
Attorney, Agent, or Firm—Hill, Gross, Simpson, Van Santen, Steadman, Chiara & Simpson

[57] ABSTRACT

A method and apparatus is disclosed for producing a laminated sheet wherein a thin film laminate is provided which is formed of a thin film laminating or substrate sheet with a heat reactivatible adhesive layer on one side thereof to produce a combined thickness of 1½ to 3 mils. On the other side of the laminating or substrate sheet a paper carrier sheet is adhesively attached for stiffening the thin film laminating sheet. The thin film laminate or substrate is folded to form a pouch and the sheet to be laminated is placed therebetween. The pouch is then processed in an oven-type laminator to produce the laminated sheet with attached carrier sheet. Finally, the carrier sheet is stripped away to produce the final product. By use of an integral carrier sheet, the relatively thin film laminating sheets may be conveniently used in conventional oven laminators without the need for special supporting techniques.

5 Claims, 5 Drawing Figures

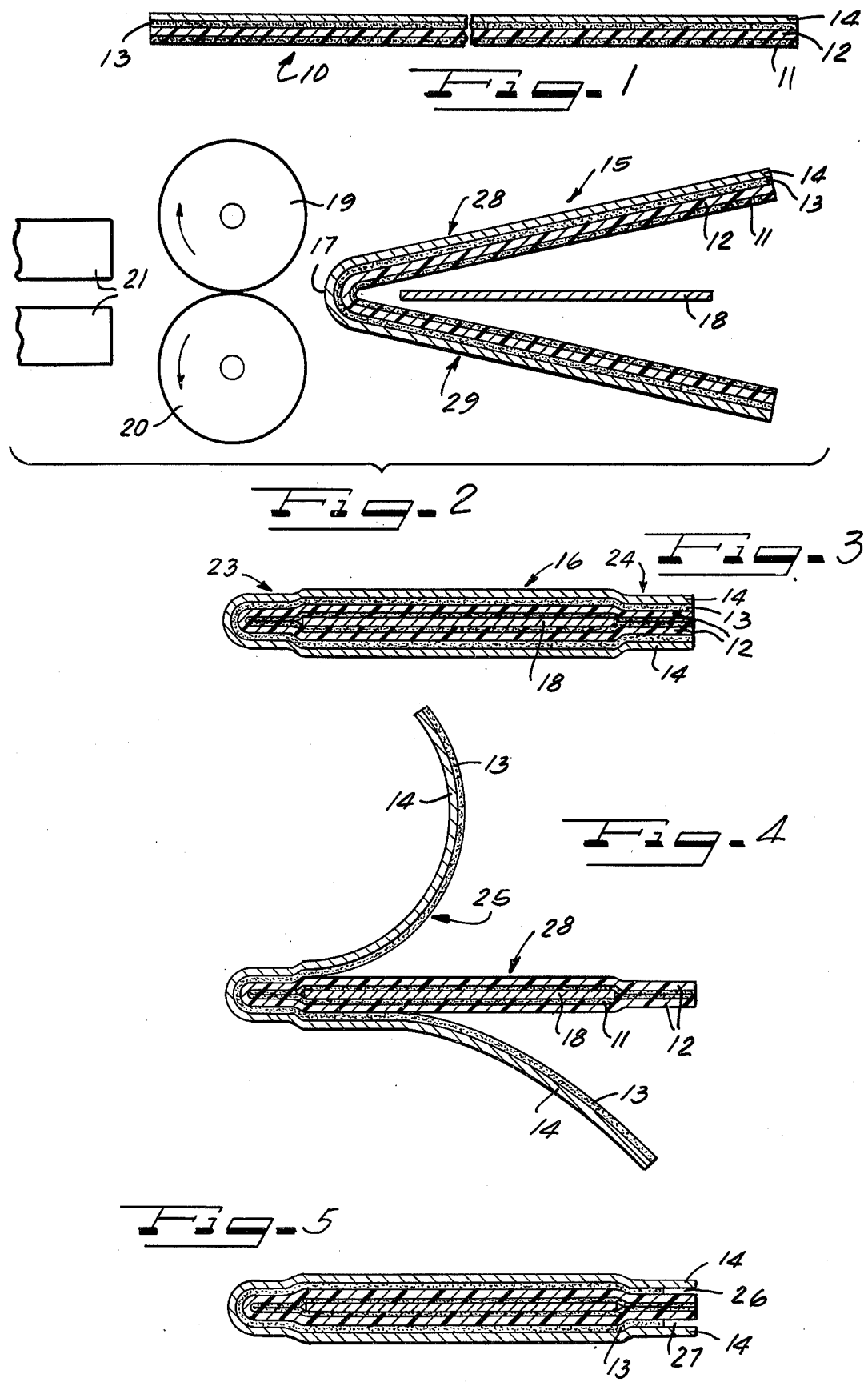

METHOD OF PRODUCING LAMINATED SHEETS USING LAMINATED POUCH SUPPORT

BACKGROUND OF THE INVENTION

1. Field of the Invention

This invention relates to lamination pouches for paper sheets, cards, or the like.

2. Description of the Prior Art

Heavy gauge laminating pouches consisting of paired five, ten and even fourteen mil polyester sheets bearing polyethylene or copolymer heat reactivatible adhesives are commonly used as described in U.S. Pat. No. 3,711,355. These pouches find extensive use in the so-called identification card market. Such cards are shown in U.S. Pat. No. 3,279,826. Identification cards generally are wallet size and comparatively rigid. While small, heavy gauge pouches are useful in the fabrication of identification cards, large heavy gauge pouches, despite their convenience, are not economical for laminating typical sheet documents such as standard 8½ by 11 inch paper sheets. Attempts to market larger, more economical pouches employing pairs of 1½ or 3 mil laminating film sheets (including the heat reactivatible adhesive layer) have the disadvantage of being too flimsy and consequently difficulty is encountered in inserting the product to be laminated within the pouch. Leaves of the pouch become electrostatically charged and are difficult to separate and straighten when the films are very thin. Furthermore, the flimsy or limp unlaminated pouch together with the product cannot consistently be processed successfully through oven-type laminators as described in U.S. Pat. No. 3,711,355 without a carrying device. Previously, a carrying device formed of a separate, folded sheet of aluminum foil or aluminum clad paper was provided to loosely receive a product to be laminated with polyester films loosely positioned on either side of the product being laminated. This carrier was intended to receive excessive heat reactivatible adhesive squeezeout when laminating with relatively thick film laminates.

As a result of these difficulties, thin film laminates have generally been fabricated in roll film laminators as shown, for instance, in U.S. Pat. No. 3,401,439 where a continuous web of film containing the product to be laminated issues from the machine and individually laminated sheets are severed from the web and trimmed appropriately. While this laminating process is effective, the web severance and trimming aspects are time-consuming and difficult to do well.

SUMMARY OF THE INVENTION

It is an object of this invention to provide a thin laminate film pouch, particularly for laminating relatively large paper sheets, which has enough rigidity to eliminate handling difficulties and which does not require the use of a separate carrier assembly.

It is a further object of this invention to provide a laminating pouch of thin film which may be effectively used with oven-type laminators which heat a pre-assembled laminating pouch surrounding a product to be laminated.

According to the invention, a polyethylene or copolymer coated polyester sheet having a heat reactivatible adhesive on one side is joined to a paper sheet on the other side via a pressure sensitive adhesive. When this assembly is folded in the middle, an unlaminated thin film pouch is provided within its own carrier. When combined with a product to be laminated and processed through an oven-laminator such as described in U.S. Pat. No. 3,711,355, a compound laminate is formed. The outer sheet containing the pressure sensitive adhesive is then stripped away from the assembly and the final laminate is exposed to view and ready for use.

The paper sheet containing pressure sensitive adhesive, when joined to the film pouch, provides the flimsy film pouch with body and stiffness which simplifies manufacture, improves packaging, and permits convenient handling of the product to be laminated and its assembly. The increased stiffness of the assembly eliminates the need for a separate carrier as the assembly proceeds through the previously mentioned oven-type laminator without sagging.

To promote ease in use, the pouch has no pressure sensitive adhesive along the portion of an edge between the paper sheet and the polyester film sheet. This permits finger gripping for easily stripping the carrier sheet off of the laminated product.

BRIEF DESCRIPTION OF THE DRAWINGS

FIG. 1 is a side view of a film laminate with an integral carrier sheet as utilized in this invention;

FIG. 2 is a side view of a folded film laminate forming a pouch for receiving a product to be laminated together with a partial side view of an oven-type laminator;

FIG. 3 is a side view of a laminated product prior to removal of the carrier sheet;

FIG. 4 is a side view of a laminated product in which the carrier is partially stripped away; and FIG. 5 is a side view of an alternate embodiment of the invention in which a finger grip is provided for removal of the carrier sheet.

DESCRIPTION OF THE PREFERRED EMBODIMENTS

A film laminate or substrate with an integral carrier is generally shown at 10 in FIG. 1. The film laminate is formed of a sandwich comprising a polyethylene or copolymer heat reactivatible adhesive layer 11, a polyester film sheet 12, a pressure adhesive sensitive layer 13, and a sheet 14 which is preferably paper but which may also be other types of sheet material suitable for providing adequate stiffness for the polyester film sheet 12.

Typically, the individual polyester film sheet 12 and heat reactivatible layer 11 have a combined thickness between 1½ and 3 mils with a maximum thickness seldom exceeding 6 mils. Laminating pouches in which each of two facing leaves have thicknesses greater than 6 mils are typically considered heavy gauge pouches such as used with I.D. cards and which consequently do not require stiffening by use of an integral carrier, but may use one because of the aforementioned squeezeout problem.

As shown in FIG. 2, a product 18 to-be-laminated is surrounded by an unlaminated thin film pouch 15 which is formed by bending the laminate 10 at the middle to form upper and lower leaves 28 and 29 joined at a fold 17. For convenient use the laminate is usually supplied to the user tightly prefolded.

The product 18 to be laminated will typically be sheets or documents larger than typical identification card sizes such as 2½ by 3 inches. 8½ by 11 inch or even larger sheets or documents, for example, may be easily laminated according to the method of this invention.

With such large size paper sheets, it is desirable to utilize a thin laminating film with heat reactivatible adhesive of the 1½ to 3 mil variety. However, this invention is also useful in constructing identification cards where it is desirable to utilize an inexpensive light gauge laminating film.

As also shown in FIG. 2, an oven-type laminator such as shown in U.S. Pat. No. 3,711,355 is employed for laminating the polyester film sheet 12 via the polyethylene 11 onto and around the product 18 to be laminated. Such a laminator, a portion of which is shown in FIG. 2, has input rollers 19 and 20 and a heater 21 spaced above and/or below a path of gravel along which the lamination pouch passes. With such a laminator, if the carrier sheet 14 were not employed, proper alignment and processing of the pouch through the oven-type laminator would be very difficult due to the thin, light gauge nature of the polyester film 12.

FIG. 3 illustrates a compound laminate 16 formed about a product 18 after processing through the oven-type laminator shown in FIG. 2. Sealed portions 23 and 24 are formed at each end of the laminate. In this figure, the carrier sheet 14 still remains on the laminate.

FIG. 4 illustrates the stripping or pulling away of the carrier sheet 25 comprises of the carrier sheet 14 and pressure sensitive adhesive 13. After removal of the carrier 25, the finished film pouch 28 functioning as a laminate over the product 18 is ready for use.

In an alternate embodiment shown in FIG. 5, the carrier sheet 14 has uncovered outer edge portions 26 and 27 to which the pressure sensitive adhesive 13 is not applied. This permits suitable finger gripping of the carrier sheets 14 for the stripping away operation illustrated in FIG. 4.

Although various minor modifications may be suggested by those versed in the art, it should be understood that we wish to embody within the scope of the patent warranted hereon, all such embodiments as reasonably and properly come within the scope of our contribution to the art.

We claim as our invention:

1. A method for economically producing large size laminated sheets, comprising the steps of:
   (a) providing a thin film polyester laminate having a heat reactivatible adhesive layer covering one side thereof, a combined thickness of the laminate and adhesive layer being less than 5 mils and dimensions of the laminate being sufficient to cover both sides of a paper sheet to be laminated having dimensions of at least 8½" by 11";
   (b) adhering by a pressure sensitive adhesive a stiffening carrier sheet to the side of the laminate opposite the one side;
   (c) folding the thin film laminate in half to form a film pouch of first and second leaves and placing the sheet to be laminated between the folds facing the heat reactivatible adhesive layers of the leaves;
   (d) processing the pouch and sheet to be laminated in a laminating machine to produce a laminated sheet; and
   (e) pulling away the carrier sheet and pressure sensitive adhesive from the laminated sheet.

2. The method of claim 1 in which the heat reactivatible layer and the thin film laminating sheet have a combined thickness less than 3 mils.

3. The method of claim 2 in which the heat reactivatible adhesive is polyethylene.

4. The method of claim 2 in which the heat reactivatible adhesive is a copolymer.

5. The method of claim 2 in which a portion along an edge of the carrier sheet is not covered with pressure sensitive adhesive to provide a finger grip for stripping away the carrier sheet.

* * * * *